(12) United States Patent
Pierce (10) Patent No.: US 8,849,872 B2
(45) Date of Patent: Sep. 30, 2014

(54) PROVIDING A MODEL-VIEW-CONTROLLER RELATIONSHIP

(75) Inventor: Darryl L. Pierce, Apex, NC (US)

(73) Assignee: Red Hat, Inc., Raleigh, NC (US)

( * ) Notice: Subject to any disclaimer, the term of this patent is extended or adjusted under 35 U.S.C. 154(b) by 258 days.

(21) Appl. No.: 11/848,510

(22) Filed: Aug. 31, 2007

(65) Prior Publication Data

US 2009/0063497 A1   Mar. 5, 2009

(51) Int. Cl.
*G06F 17/00* (2006.01)
*G06F 17/30* (2006.01)
*G06Q 10/00* (2012.01)

(52) U.S. Cl.
CPC ..................................... *G06Q 10/00* (2013.01)
USPC ........................................ 707/805; 705/27.1

(58) Field of Classification Search
USPC ........... 709/201, 203, 213; 719/328; 707/825, 707/828, 999.102, 615, 805, 1–3, 6, 10, 707/100, 101, 102, 103 Y, 103 Z, 200, 201, 707/203; 715/273; 705/26.1, 27.1
See application file for complete search history.

(56) References Cited

U.S. PATENT DOCUMENTS

| | | | | |
|---|---|---|---|---|
| 7,072,860 B2* | 7/2006 | Kakuta | .......................... | 705/80 |
| 7,181,445 B2* | 2/2007 | Bebo et al. | .......................... | 1/1 |
| 7,207,034 B2* | 4/2007 | Burke et al. | .................. | 715/273 |
| 7,287,003 B2* | 10/2007 | Hodson et al. | ............... | 705/26.8 |
| 7,383,269 B2* | 6/2008 | Swaminathan et al. | ...... | 707/101 |
| 7,590,567 B2* | 9/2009 | Hopson et al. | ............. | 705/26.81 |
| 2002/0133414 A1* | 9/2002 | Pradhan et al. | .................. | 705/26 |
| 2005/0114863 A1* | 5/2005 | Williamson et al. | .......... | 719/310 |
| 2008/0178113 A1* | 7/2008 | Headrick et al. | ............... | 715/778 |

* cited by examiner

*Primary Examiner* — Marc Filipczyk
(74) *Attorney, Agent, or Firm* — Lowenstein Sandler LLP (57) ABSTRACT

An embodiment relates to a method of providing data. The method includes monitoring a user interface to detect a change in the user interface. The change indicates a desired modification to data presented in the user interface. The method also includes generating a request to modify data in response to detecting the change in the user interface and transmitting the request to a repository storing the data to be modified.

10 Claims, 7 Drawing Sheets

PROVIDING A MODEL-VIEW-CONTROLLER RELATIONSHIP

FIELD

This invention relates generally to products and services, more particularly, to systems and methods for providing support for a products and services.

DESCRIPTION OF THE RELATED ART

The proliferation of the World Wide Web through the Internet has made a wealth of products and services available to users to purchase and use nearly instantaneously. Vendors, service providers, manufacturers, third party distributors, etc., may have web sites for the users to review and purchase their respective products and/or services and to obtain technical support for the product and/or services.

In order to offer the products and services to the user, the web sites must present a large amount of data to the user. Additionally, the web sites must present the data in a variety of configurations depending on the user. For instance, a product ordering system can use web pages to sell a product. An inventory module can use web pages as an interface to monitor and manage product inventory. Each of these web pages utilize the same data but present the data in different configurations.

The update of the data to any interested web pages are typically "hard-wired", i.e., the data paths to the interested pages are hard coded directly to the data repository. However, if there any changes in the manner the data is displayed or presented, each web page and data repository must be modified to accommodate the change. This may be time consuming if the data is presented or stored in different manners. Thus, there is a need in the art for effectively integrating the presentation, modification, and storage of data.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and service portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems and methods for integrating the presentation, modification, and storage of data. A controller can be configured to establish a model-view-controller ("MVC") relationship. The controller can be configured to facilitate the flow of data between user interface and repositories storing data presented in the user interface. The controller can be configured to monitor the user interface for any change in the user interface. The change indicates that the user desires to modify data presented in the user interface. The controller can be configured to request that the repositories modify data stored therein and presented in the user interface. The controller can also be configured to provide the modified data to the user interface.

Figure 1:
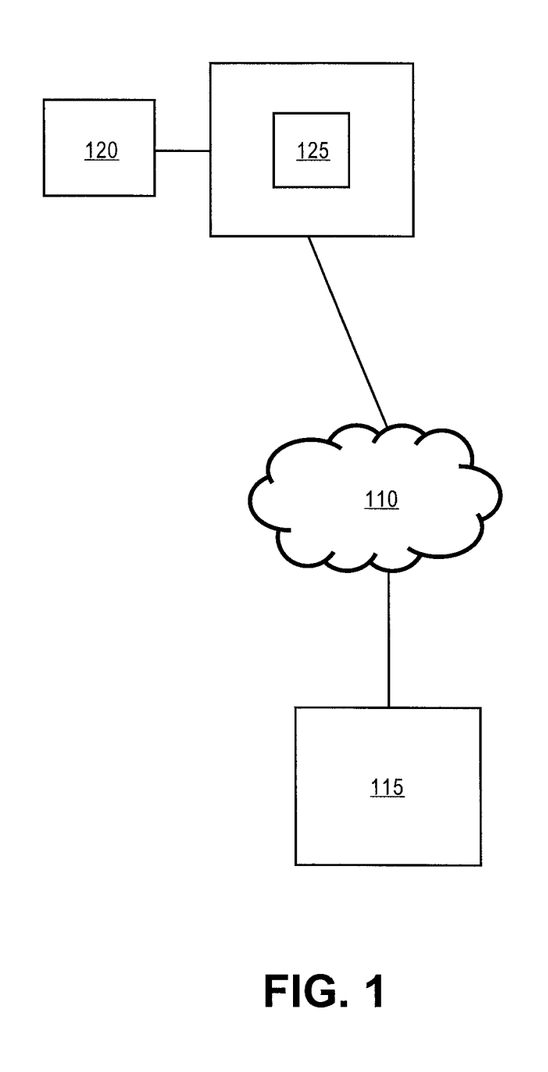
FIG. 1 depicts an exemplary system in accordance with an embodiment.

FIG. 1 illustrates an exemplary system 100 in accordance with an embodiment. It should be readily apparent to those of ordinary skill in the art that system 100 depicted in FIG. 1 represents a generalized schematic illustration and that other components may be added or existing components may be removed or modified. Moreover, system 100 may be implemented using software components, hardware components, or combinations thereof.

As shown in FIG. 1, system 100 includes a client 105, a network 110 and a server 115. Client 105 is configured to provide a user interface 120 for a user to interact with server 115. The users can be private individuals, employees of private business or public entities or other persons interested in accessing server 115. Client 105 can be implemented in personal computers, personal mobile devices, workstations or other networked computing platforms. While FIG. 1 illustrates one client 105, those of ordinary skill in the art will realize that system 100 can include additional clients 105.

Network 110 can be a combination of wide area and local area networks such as the Internet. Network 110 can be configured to provide a communication channel between client 105 and server 115. Network 110 can implement a variety of network protocols to provide the communication channel such as Internet Protocol ("IP") Vx, ATM, SONET, or other similar network protocols.

Server 115 is configured to provide a variety of services and functions to client 105. Server 115 can be configured to provide application services, database services, website services, and the like. Server 115 can be implemented in server computers, mainframes, workstations or other networked computing platforms. While FIG. 1 illustrates one server 115, those of ordinary skill in the art will realize that system 100 can include additional servers 115. In FIG. 1, controller 125 can reside in client 105. Additionally, controller 125 may reside in server 115 in yet another embodiment.

Figure 2:
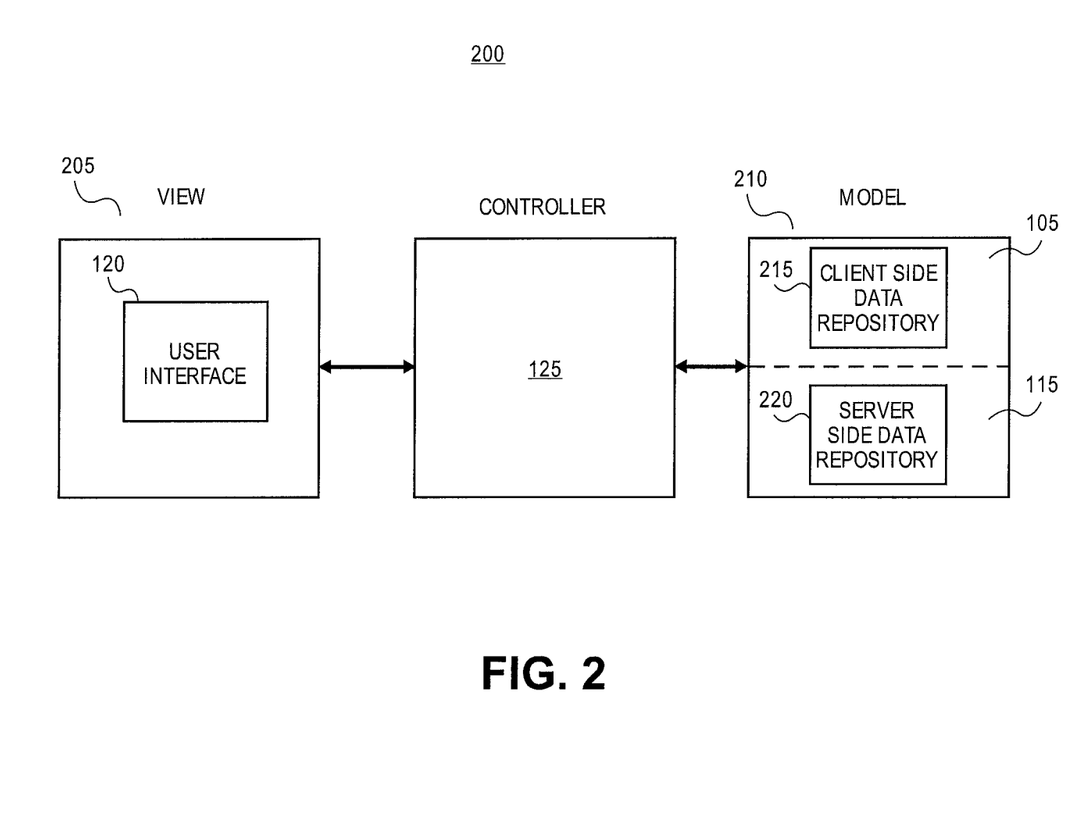
FIG. 2 illustrates an exemplary logical data relationship in accordance with another embodiment.

In accordance with various embodiments, client 105 can include a controller 125. Controller 125 can be configured to establish a model-view-controller ("MVC") relationship in system 100. A MVC relationship is an architecture in which the presentation and modification data are decoupled. In the MVC relationship, the components of system 100 are categorized based on whether the components present data or store data. FIG. 2 is a diagram that illustrates the logical relationship of data flow in the components of system 100.

FIG. 2 depicts a MVC relationship 200 in system 100 in accordance with yet another embodiment. As illustrated, MVC relationship 200 groups the components of system 100 into a view 205, a controller 210, and a model 215. Controller 210 is coupled between view 205 and model 215 in order to render model 215 transparent to view 205.

View 205 includes components of system 100 that present data to the user and receive requests to modify the data. View 205 can include user interface 120. For example, user interface 120 can be a web browser in which data is presented to a user from web sites. In such an example, the web browser can present data in various data objects, such as a shopping cart.

Model 210 includes all data repositories in client 105 and server 115 that store data presented to users in view 205. Model 210 can include client side data repository 215 and server side data repository 220. For example, if user interface 120 is a web browser, client side data repository 215 and server side data repository 220 can store information presented in the data objects of the web browser.

Controller 125 is coupled between view 205 and model 210. Controller 125 can be configured to facilitate the flow of data between model 210 and view 205. Controller 125 can be configured to a monitor view 205 for a request to modify data presented in view 205. Controller 125 can be configured to request that model 210 update the data based on the user's request. Controller 125 can also be configured to provide the updated data to view 205.

Figure 3:
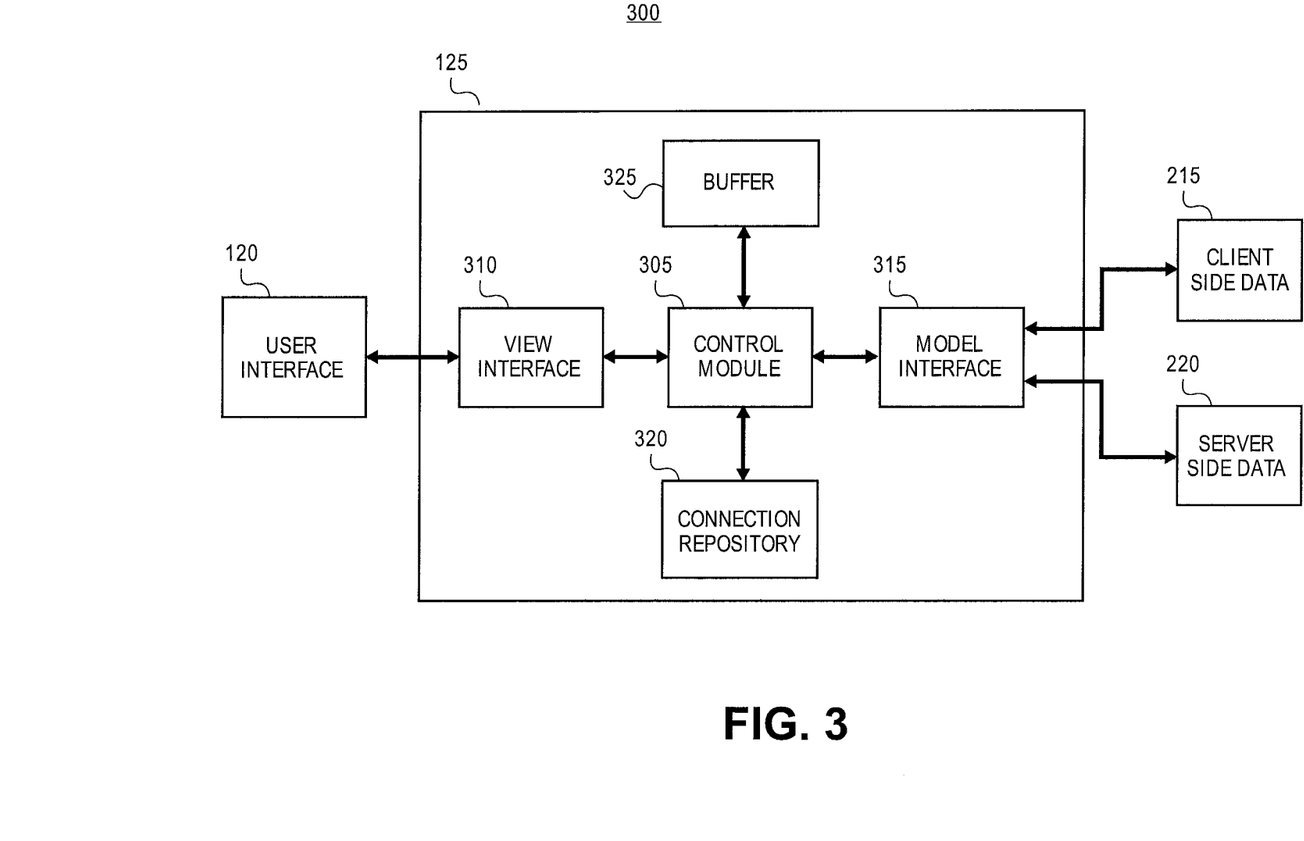
FIG. 3 depicts an exemplary controller shown in FIG. 1 in accordance with yet another embodiment.

FIG. 3 depicts a more detailed block diagram 300 of controller 125 in accordance with another embodiment. It should be readily apparent to those of ordinary skill in the art that the diagram depicted in FIG. 3 represents a generalized schematic illustration and that other components may be added or existing components may be removed or modified.

As shown in FIG. 3, controller 125 can comprise a control module 305, a view interface 310, a model interface 315, a connection repository 320, and a buffer 325. Modules 305-325 of controller can be implemented as software components, hardware components or combinations thereof. More particularly, modules 305-325 can be implemented using objected oriented programming languages, such as Java or Javascript. For example, modules 305-325 can be implemented using Javascript functions, such as a lambda (anonymous) function, to serve as controller 125. By using Javascript, controller 125 can easily connect a model and a view without additional code.

Control module 305 can be configured to manage modules 310-320 to provide the functionality of controller 125 as previously described and further described herein below. Controller 205 can be configured, among other things, to monitor user interface 120 for a request to modify data presented in user interface 120.

Control module 305 can be coupled to view interface 310. View interface 310 can be configured to provide an interface between control module 305 and user interface 120. For example, user interface 310 can be configured to monitor user interface 310 and data objects of user interface 310 or request to modify data in client side data repository 215 and server side data repository 220.

Control module 305 can be coupled to model interface 315. Model interface 315 can be configured to provide an interface between client side data repository 215 and server side data repository 220. For example, model interface 315 can be configured to initiate protocols to communicate with client side data repository 215 and server side data repository 220.

Control module 305 can also be coupled to connection repository 320. Connection repository 320 can be configured to store information to facilitate data flow between user interface 120 and client side data repository 215 and server side data repository 220. Connection repository 320 can be configured to store the location of data presented in user interface 310. Connection repository 320 can be configured to store the format of data presented in the data objects of user interface 120 and the format of data stored in client side data repository 215 and server side data repository 220.

Control module 305 can also be configured to generate a request for modifying data in client side data repository 215 or server side data repository 220 in response to detecting a change user interface 120. To generate the request, control module 305 can examine a change in user interface 120 and determine the storage location of the data being modified by the request. Control module 305 can be further configured to query connection repository 320 to determine the format of either client side data repository 215 or server side data repository 220.

Control module 305 can also be coupled to a buffer 325. Buffer 325 can be configured to store data transferred between user interface 120 and client side data repository 215 and/or server side data repository 220. Buffer 325 can be configured to buffer the data in the event a connection is interrupted between user interface 120 and client side data repository 215 and/or server side data repository 220.

Figure 4A:
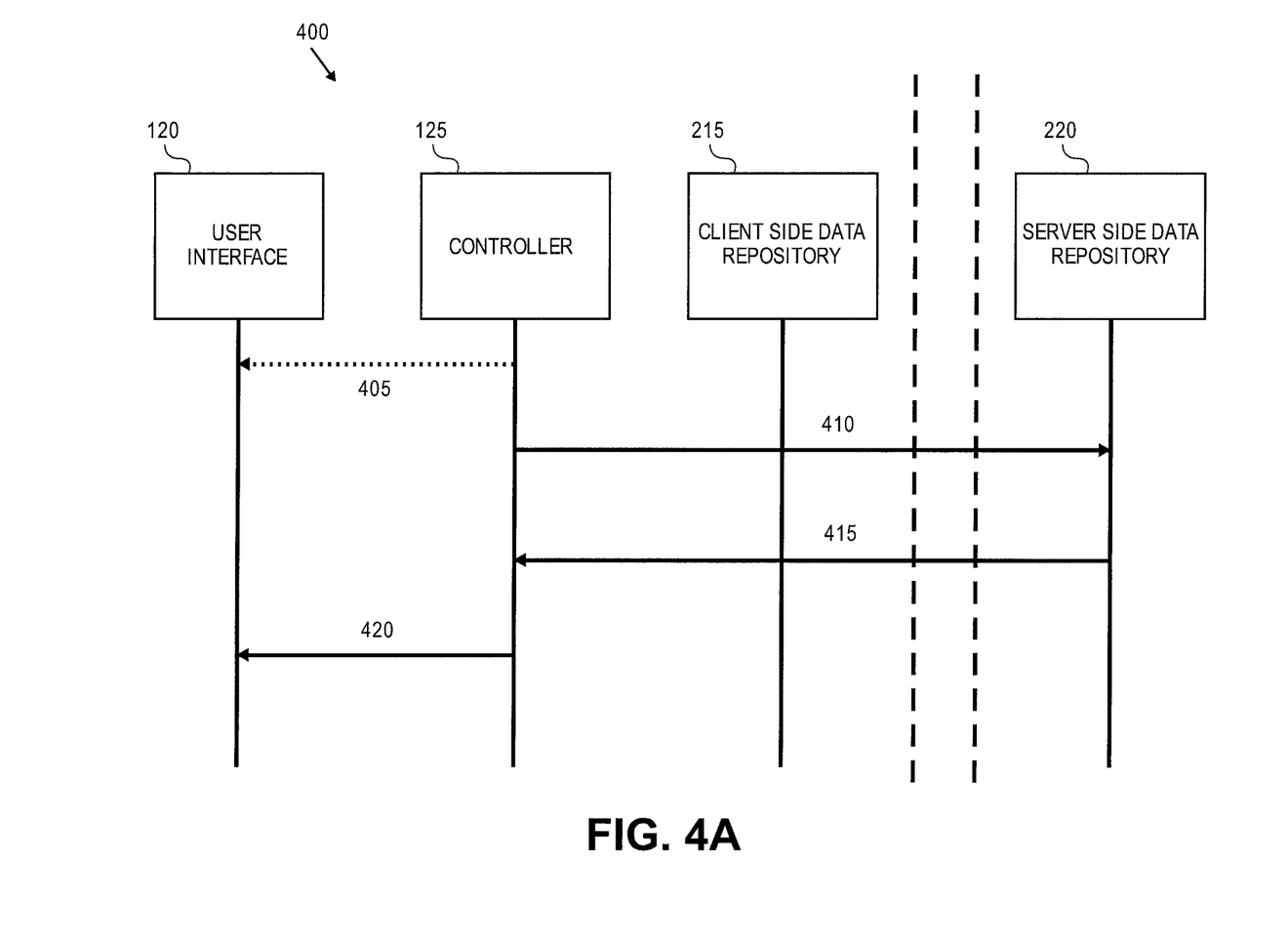
FIGS. 4A-4C illustrate exemplary process flow in accordance with other embodiments.

FIG. 4A illustrates a process flow 400 for modifying data in the model 210 in accordance with yet another embodiment. For illustrative purposes only, user interface can be a web browser displaying a commerce web site including a shopping chart data object. Client side data repository 215 and server side data repository 220 can store data presented by user interface 120 in the shopping cart.

In step 405, controller 125 can monitor user interface 120 for a change in user interface 120. For example, the user can desire to modify the shopping chart by entering new or modifying data, such as a coupon promotion code for discounts on products in the shopping cart. When controller 125 detects the user entering the product code, controller 125 can generate a request to modify data stored in server side data repository 220.

Controller 125 can generate a modify data message and transmit the message to server side data repository 220, in step 410. For example, controller 125 can be configured to generate a message containing an identification of the shopping cart modified and the promotion code entered.

When received, server side data repository 220 can modify the shopping cart data. For example, server side data repository 220 can confirm the promotion code and update the price of the product.

Then, in step 415, server side data repository 220 can transmit the modified data to controller 125. In step 420, controller 125 can update the shopping cart of user interface 120 with the modified data.

Figure 4B:
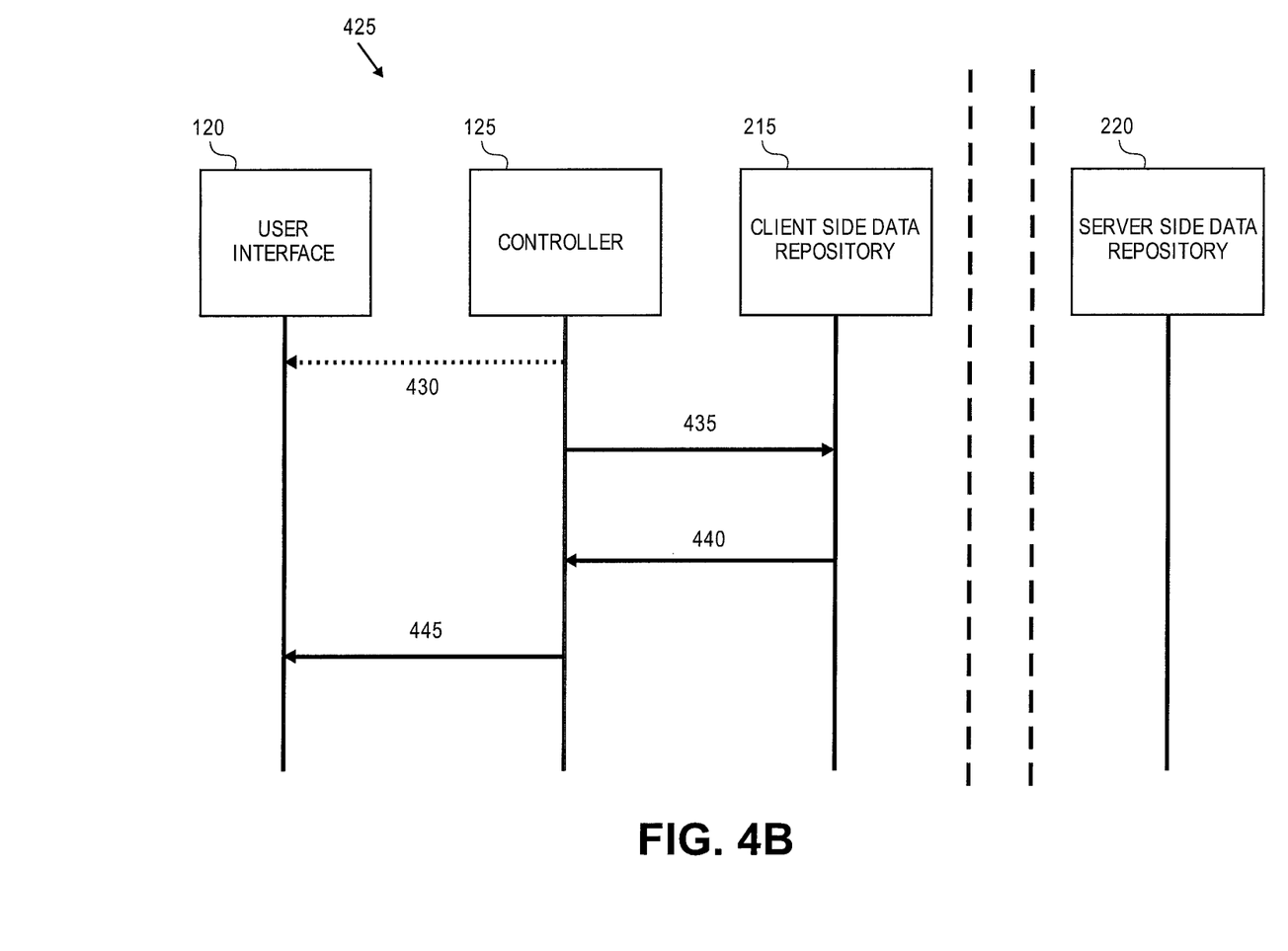

FIG. 4B illustrates a process flow 425 for modifying data in the model 210 in accordance with yet another embodiment. For illustrative purposes only, user interface can be a web browser displaying a commerce web site including a shopping chart data object. Client side data repository 215 and server side data repository 220 can store data presented by user interface 120 in the shopping cart.

In step 430, controller 125 can monitor user interface 120 for a change in user interface 120. For example, the user can desire to modify the shopping chart by entering new or modified data that may be stored on client side data repository 215. When controller 125 detects the change, controller 125 can generate a request to modify data stored in client side data repository 215.

Controller 125 can generate a modify data message and transmit the message to client side data repository 215, in step 435. For example, controller 125 can be configured to generate a message containing an identification of the shopping cart modified and the data to be modified in client side data repository 215.

When received, client side data repository 215 can modify the shopping cart data. For example, client side data repository 215 can add, delete, or modify data stored therein.

Then, in step 440, client side data repository 215 can transmit the modified data to controller 125. In step 445, controller 125 can update the shopping cart of user interface 120 with the modified data.

Figure 4C:
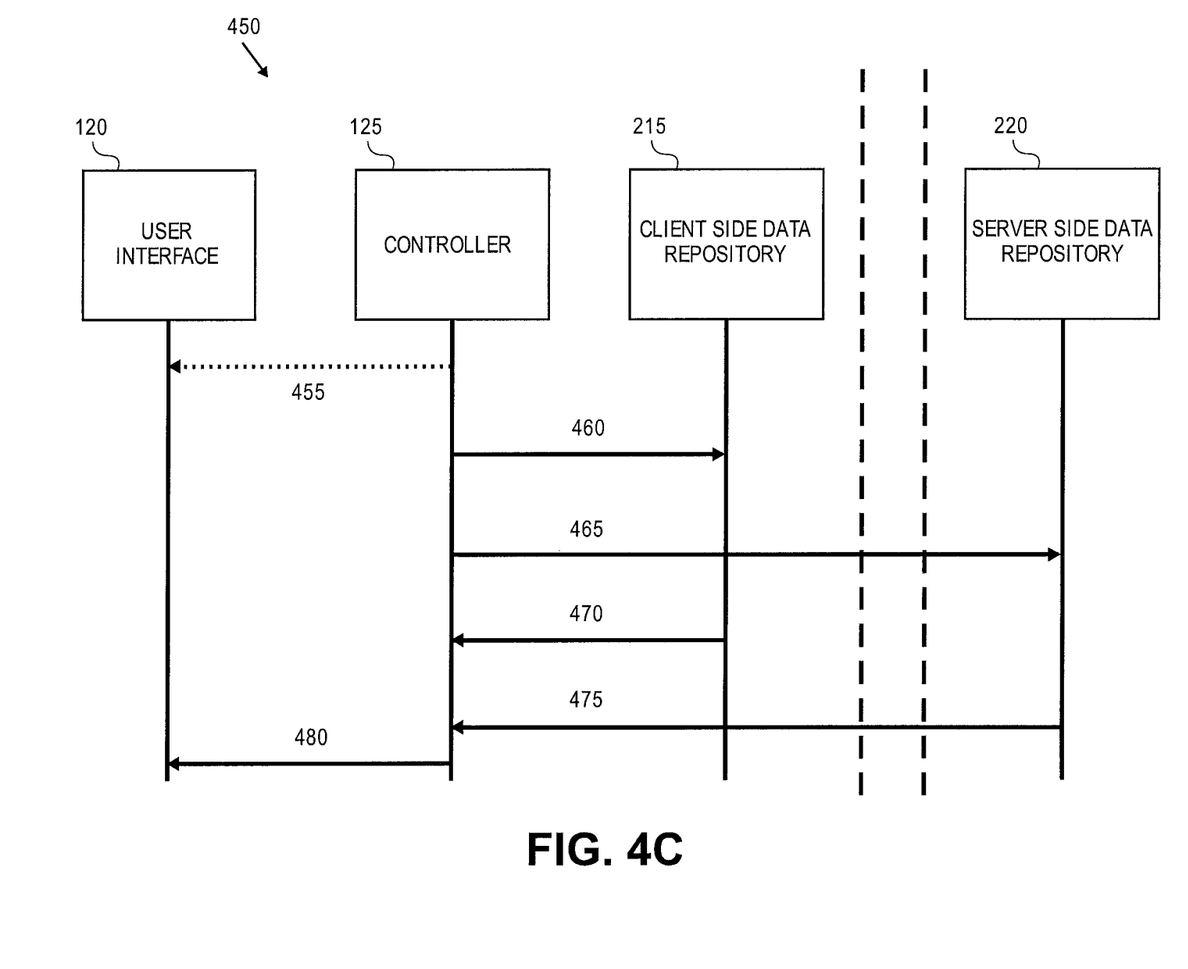

FIG. 4C illustrates a process flow 450 for modifying data in the model 210 in accordance with yet another embodiment. For illustrative purposes only, user interface can be a web browser displaying a commerce web site including a shopping chart data object. Client side data repository 215 and server side data repository 220 can store data presented by user interface 120 in the shopping cart.

In step 455, controller 125 can monitor user interface 120 for a change in user interface 120. For example, the user can desire to modify the shopping chart by entering new or modifying data that may be stored on client side data repository 215 and server side data repository 220. When controller 125 detects the change, controller 125 can generate a request to modify data stored in client side data repository 215.

Controller 125 can generate a modify data message and transmit the message to client side data repository 215, in step 460. For example, controller 125 can be configured to generate a message containing an identification of the shopping cart modified and the data to be modified in client side data repository 215.

Controller 125 can then generate a modify data message and transmit the message to server side data repository 220, in step 465. For example, controller 125 can be configured to generate a message containing an identification of the shopping cart modified and the data to be modified in server side data repository 220.

When received, client side data repository 215 and server side data repository 220 can modify the shopping cart data. For example, client side data repository 215 and server side data repository 220 can add, delete, or modify data stored therein.

Then, in step 470, client side data repository 215 can transmit the modified data to controller 125. Next, in step 475, server side data repository 220 can transmit the modified data to controller 125. In step 480, controller 125 can update the shopping cart of user interface 120 with the modified data.

Figure 5:
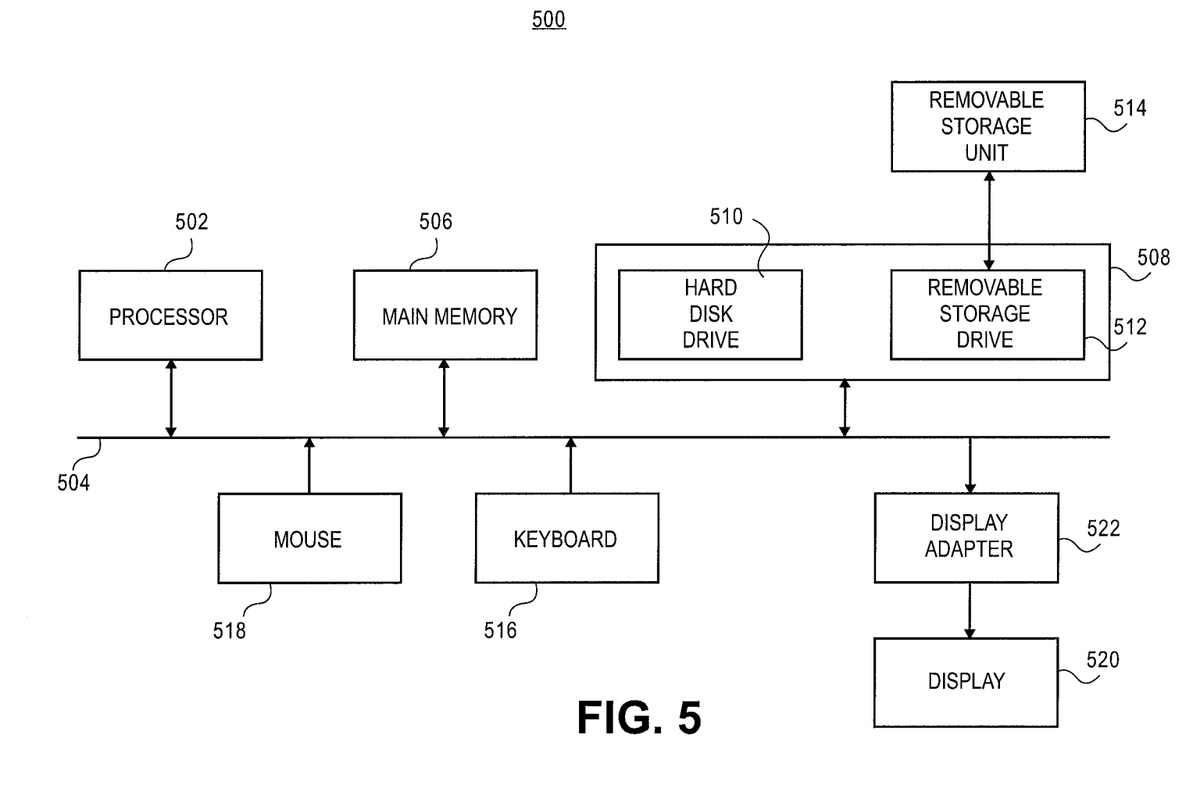
FIG. 5 depicts an exemplary computing platform in accordance with yet another embodiment.

FIG. 5 illustrates an exemplary block diagram of a computing platform 500 where an embodiment may be practiced. The functions of the controller 125 can be implemented in program code and executed by computing platform 500. Controller 125 may be implemented in computer languages such as Java and Javascript.

As shown in FIG. 5, computing platform 500 includes one or more processors, such as processor 502 that provide an execution platform for embodiments of controller 125. Commands and data from processor 502 are communicated over a communication bus 504. Computing platform 500 also includes a main memory 506, such as a Random Access Memory (RAM), where controller 125 can be executed during runtime, and a secondary memory 508. Secondary memory 508 includes, for example, a hard disk drive 510 and/or a removable storage drive 512, representing a floppy diskette drive, a magnetic tape drive, a compact disk drive, etc., where a copy of a computer program embodiment for controller 125 can be stored. Removable storage drive 512 reads from and/or writes to a removable storage unit 514 in a well-known manner. A user interfaces with controller 125, and a keyboard 516, a mouse 518, and a display 520. Display adapter 522 interfaces with the communication bus 504 and display 520. Display adapter 522 also receives display data from processor 502 and converts the display data into display commands for display 520.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   detecting, by a controller implemented in Javascript executed by a processor, a change by a user to content of a shopping cart presented in a user interface of a client comprising a first repository, the user interface coupled to a second repository via a network, wherein the change indicates that the content is to be updated; and
   in response to detecting the change, without additional user interaction:
      generating a first request to modify data stored in the first repository and a second request to modify data stored in the second repository, wherein the first request and the second request are different;
      transmitting the first request to the first repository;
      transmitting the second request to the second repository;
      receiving, by the controller, first modified data modified by the first repository and second modified data modified by the second repository in response to the first request and the second request, wherein the first modified data and the second modified data are different;
      storing at least one of the first modified data or the second modified data in a buffer coupled to the controller; and updating, by the controller, a first portion of the content of the shopping cart presented in the user interface with the first modified data and a second portion of the content of the shopping cart presented in the user interface with the second modified data.

2. The method of claim 1, further comprising determining a communication protocol of the first repository.

3. The method of claim 1, further comprising determining a communication protocol of the second repository.

4. An apparatus comprising:
a client comprising a first repository and a user interface to present content of a shopping cart to a user, the user interface coupled to a second repository via a network;
a controller implemented in Javascript coupled to the user interface, the controller executed by a processor to:
detect a change by a user to content of the shopping cart presented in the user interface, wherein the change indicates that the content is to be updated, and
in response to detecting the change, without additional user interaction:
generate a first request to modify data stored in the first repository and a second request to modify data stored in the second repository, wherein the first request and the second request are different,
transmit the first request to the first repository,
transmit the second request to the second repository,
receive first modified data modified by the first repository and second modified data modified by the second repository in response to the first request and the second request, wherein the first modified data and the second modified data are different,
store at least one of the first modified data or the second modified data in a buffer coupled to the controller, and
update a first portion of the content of the shopping cart presented in the user interface with the first modified data and a second portion of the content of the shopping cart presented in the user interface with the second modified data.

5. The apparatus of claim 4, further comprising a connection repository to store respective locations of the first repository and the second repository and respective formats of the first repository and the second repository.

6. The apparatus of claim 5, wherein the controller determines a communication protocol of the first repository and the second repository.

7. A system comprising:
a first repository to store content to be presented to a user and an interface coupled via a network to a second repository to store content of a shopping cart to be presented to the user; and
a processor to execute a controller implemented in Javascript, the controller coupled to a user interface, the controller to:
detect a change by the user to content of the shopping cart presented in a user interface, wherein the change indicates that the content is to be updated, and
in response to detecting the change, without additional user interaction:
generate a first request to modify data stored in the first repository and a second request to modify data stored in the server side repository, wherein the first request and the second request are different,
transmit the first request to the first repository,
transmit the second request to the second repository,
receive first modified data modified by the first repository and second modified data modified by the second repository in response to the first request and the second request, wherein the first modified data and the second modified data are different,
store at least one of the first modified data or the second modified data in a buffer coupled to the controller, and
update a first portion of the content of the shopping cart presented in the user interface with the first modified data and a second portion of the content of the shopping cart presented in the user interface with the second modified data.

8. The system of claim 7, further comprising a network connection to provide a communication channel for the server and the user.

9. The system of claim 7, further comprising a connection repository to store respective locations of the first repository and the second repository and respective formats of the first repository and the second repository.

10. The system of claim 9, wherein the controller determines a communication protocol of the first repository and the second repository.

\* \* \* \* \*